(12) United States Patent
Cole et al.

(10) Patent No.: US 12,050,561 B2
(45) Date of Patent: *Jul. 30, 2024

(54) EJOURNAL TRANSCODING

(71) Applicant: Amazon Technologies, Inc., Seattle, WA (US)

(72) Inventors: Timothy Daniel Cole, Seattle, WA (US); John Michael Morkel, Seattle, WA (US); Yevgeniy Mikhaylyuta, Sammamish, WA (US); Allan Henry Vermeulen, Parksville (CA); Christopher Richard Jacques de Kadt, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/221,212

(22) Filed: Dec. 14, 2018

(65) Prior Publication Data

US 2019/0121792 A1 Apr. 25, 2019

Related U.S. Application Data

(63) Continuation of application No. 15/199,889, filed on Jun. 30, 2016, now Pat. No. 10,157,194.

(51) Int. Cl.
*G06F 16/21* (2019.01)
*G06F 16/18* (2019.01)
*G06F 16/23* (2019.01)

(52) U.S. Cl.
CPC ........ *G06F 16/211* (2019.01); *G06F 16/1815* (2019.01); *G06F 16/213* (2019.01); *G06F 16/219* (2019.01); *G06F 16/2358* (2019.01)

(58) Field of Classification Search
CPC .............. G06F 16/2365; G06F 16/211; G06F 16/1815; G06F 16/219; G06F 16/2329; G06F 16/20; G06F 16/2358; G06F 16/2379; G06F 16/258; G06F 16/213
See application file for complete search history.

(56) References Cited

U.S. PATENT DOCUMENTS

| | | | |
|---|---|---|---|
| 8,364,648 B1 * | 1/2013 | Sim-Tang | G06F 16/20 707/674 |
| 10,902,185 B1 * | 1/2021 | Cairns | G06F 40/166 |
| 2015/0339359 A1 * | 11/2015 | Takaoka | G06F 16/254 707/602 |
| 2017/0161291 A1 | 6/2017 | Specht et al. | |
| 2018/0152514 A1 * | 5/2018 | Håkansson | G06F 16/258 |

* cited by examiner

*Primary Examiner* — Marcin R Filipczyk
(74) *Attorney, Agent, or Firm* — Davis Wright Tremaine LLP

(57) ABSTRACT

A journaled database system may comprise data nodes that maintain a collection of data structured in accordance with a schema. A change to the schema may be applied by a journal module while a journal consumer continues to operate using a prior version of the schema. A buffer may be formed and have stored therein records describing state change instructions according to the prior view of the schema. An index of correspondence between the records in the buffer and in the source journal may be maintained.

20 Claims, 8 Drawing Sheets

EJOURNAL TRANSCODING

CROSS-REFERENCE TO RELATED APPLICATION

This application is a continuation of U.S. patent application Ser. No. 15/199,889, filed on Jun. 30, 2016, entitled "EJOURNAL TRANSCODING," the content of which is incorporated herein by reference in its entirety for all purposes.

BACKGROUND

Recently, distributed computing environments have been employed to maintain collections of data. Multiple computing nodes, potentially distributed across various geographic regions and data centers, may be employed to collectively provide applications with an efficient mechanism for storing and retrieving data.

Access to the data maintained in a distributed system may be described and regulated through schemas. A schema may describe the structure of data stored in the distributed system, including various elements that may pertain to a collection of data, such as tables, views, columns, data types, constraints, and so forth. However, certain issues may be associated with changes to the schema. For example, client applications may need to continue to operate even as the schema used by the collection of data evolves.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
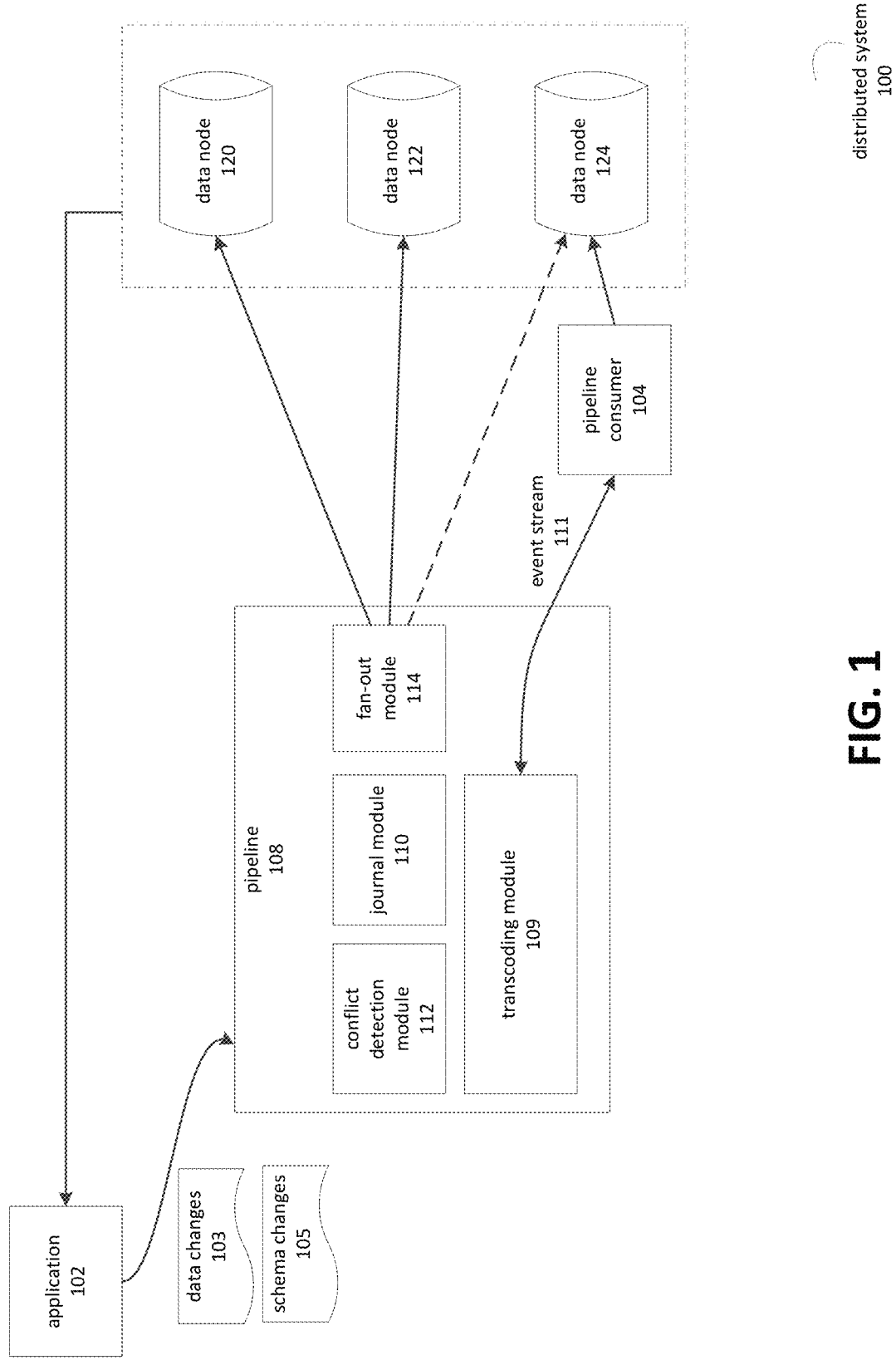
FIG. 1 is a block diagram depicting a distributed system with journaled updates.

Disclosed herein are systems, methods, and computer program products pertaining to distributed databases. Example embodiments may comprise a journaling component in which requests to modify the state of a collection of data are processed by a pipeline component subsystem. The pipeline component may analyze the requests for conflicts and then, in the absence of a conflict, durably store the instructions for later application to one of a number of storage nodes.

The distributed database may maintain a collection of data that conforms to a schema. The various elements that may make up the structure of a collection of data, such as tables and columns, may be defined by the schema. For example, a schema might define the columns that make up a table, and specify the data types of those columns. Over time, the schema of the collection may evolve. Existing tables might be split into two or more tables, new tables might be added, old columns might be deleted, and new columns might be added. Schema may also, in some instances, define subsets of data. For example, a schema might include a view definition in which the contents of a view are limited according to some criteria.

Changes to the schema of the collection may also be processed using a pipeline or journal. A change to a schema may, for example, be initially applied to a pipeline and put into effect before the changes to the schema are fully applied to the underlying collection of data. During or after this period there may remain various clients of the pipeline that are dependent upon the prior version of the schema.

In an example, a method of operating a distributed database system may involve a computing node may, by a transcoding module, perform operations that comprise receiving information indicating that a collection of data initially conforming to a first version of a schema is going to change to conform instead to a second version of the schema. Components of the distributed database, such as a pipeline or journal processing component, may remain compatible with prior versions of the schema for some time, or indefinitely, after the change.

The computing node, by the transcoding module, may further perform operations that comprise forming a buffer to store transcoded instructions to modify the state of the collection of data. The transcoded instructions may be rewritten to be in accordance with a prior version of a schema, such as the version a client is compatible with.

The operations may further include receiving information indicative of a state transition of an item of the collection of data, where the state transition is described in accordance with the second version of the schema. The instructions to change the state of the collection may be translated and stored in the buffer, in a form compatible with the first, prior version of the schema. The instruction may also be recorded in the source journal, in a format compatible with the second, subsequent version of the schema. The transcoding module may also store information indicative of correlation between the first record and the second record, for example by maintaining an index that relates entries in the source journal to corresponding entries in transcoded journals, and vice versa.

The computing node may also, by the transcoding module, perform operations that comprise sending data indicative of the state transition to a client module. The data may describe the state transition in accordance with the first, prior version of the schema.

FIG. 1 is a block diagram depicting a distributed system 100 with journaled updates. In the distributed system 100, an applications 102 accesses collections of data maintained on the data node 120-124. The application 102 may issue requests to modify the collections of data. The requests may be validated and then stored using a journaling technique, in which changes to data are durably recorded in a "journal" prior to being subsequently stored in one or more data nodes 120-124.

The data nodes 120-124 may individually or collectively maintain a collection of data. The data may be structured in accordance with, or in compliance with, a schema. The schema may define aspects of how the data in the collections is structured. Schema may, for example, define the tables, columns, data types, and constraints used when storing the data. The schema may also defined modes of interaction with the database, such as what projections, views, and data types are available for use in queries issued by the application 102.

The applications 102 may obtain data from the data nodes 120-124 in accordance with, i.e. in compliance with, the schema. The application 102 may submit various commands to store or retrieve data using references to various elements defined by the schema. Requests to modify data may be handled through the pipeline 108, while requests to obtain data may be handled through the data nodes 120-124.

The pipeline 108 may be a component of the distributed system 100. The pipeline 108 may process requests to modify data and to store new data. The pipeline 108 may durably store information describing requests to modify data or store new data, without waiting for the corresponding changes to be fully applied to the corresponding data nodes 120-124. This may improve the efficiency of the application 102, because it may continue performing other functions without needing to wait for a requested change to be fully propagated throughout the system 100.

A conflict detection module 112 may identify conflicts between a pending request to update the data state, other pending requests, and the current data state. One example of a conflict is a requested modification to a data item that is based on out of date information. For example, if an update to an item was intended to increment a counter by '10,' storing '15' as the counter value would be correct only if the current value of the counter, prior to the increment, was '5.' To perform the update, a thread in the system might first read the current value of the counter and then write a corresponding updated value. In this example, a conflict might be detected if the value of the counter was changed to '8' by some other thread, after the original thread had read the current value as '5.'

The journal module 110 may maintain a durable store of instructions to modify the data state. For example, the conflict detection module 112 might validate a request to modify the data state. If no conflict is detected and the request is deemed valid, the journal module 110 might then store corresponding instructions to modify the data state on a storage device. The instructions may be stored by the journal module 110 so as to make the record of the instructions durable, so that the changes will be applied eventually to the data nodes 120-124 even in the event of a power interruption or other system failure. The journal module 110 may typically store instructions to modify the data state along with sequencing information, such as a global timestamp or serial number.

A fan-out module 114 may apply requested changes to the collections of data maintained by the data nodes 120-124. The fan-out module may be described as an applier of the change instructions sent through the pipeline 108 and maintained by the journal module 110. Regarding the data node, in some instances one or more of the data nodes 120-124 may maintain distinct collections of data. In other instances, one or more of the data nodes 120-124 maintain partitions of a larger collection. In other instances, one or more of the data nodes 120-124 may maintain replicas of other partitions or collections.

An application 102 may issue schema changes 105 in addition to data changes 103. A schema change 105 may include requests to add a new table, to add a new column to an existing table, to add or remove a constraint on a column value, and so on. Schema changes 105 may be processed in stages.

In the first stage, the application 102 may propose a modification to the schema. The pipeline 108 may analyze the proposed change and make it durable, and begin to process instructions such as data changes 103 in accordance with the new schema. These instructions may be made durable within the pipeline even though corresponding changes to the underlying database structures have node been applied to the data nodes 120-124. For example, a request to modify the value of a column $C_{new}$ for a row of a table might be made durable, even though the column $C_{new}$ does not yet exist in any of the data nodes 120-124.

In the second stage, the schema change may be applied to one or more of the data nodes 120-124, such that the collections of data maintained by the nodes become compliant with the new version of the schema. Continuing the pervious example, in the second stage a fan-out module 114 may cause the column $C_{new}$ to be created on the data nodes 120-124.

A pipeline consumer 104 may process events from an event stream 111. In some cases, the pipeline consumer 104 may be an instance of a fan-out module 114, or may act in place of a fan-out module 114. The pipeline consumer may process events sent through the pipeline regarding data changes 103 and apply those changes to a data node 124. In some cases, the pipeline consumer 104 may also process events regarding schema changes 105.

The pipeline consumer 104 may process events from the event stream 111 that describes data changes 103 in accordance with a prior version of a schema, rather than the new version indicated by the schema changes 105. For example, in a prior version of a schema a column $C_1$ might be located in a table $T_1$, but moved to a table $T_2$ by the schema changes 105. A description of a state change relevant to the column $C_1$ might be expressed as $T_1 \cdot C_1 => `5`$ in the first case, assuming for the purpose of the example that the column value is to be set to '5.' In the new schema, however, the same change might be expressed as $T_2 \cdot C_1 => `5`$. The pipeline consumer 104 might continue to refer to $T_1 \cdot C_1$ even as other components or consumers of the pipeline 108 refer to the same data location as $T_2 \cdot C_1$. This might include consuming events that describe data in accordance with the prior schema, and to producing events (such as additional instructions to change data state) that refer to data in accordance with the prior schema.

A transcoding module 109 may be a component of the pipeline 108. The transcoding module 109 may maintain one or more buffers that maintain a view of the data state that is in accordance with the prior schema. The buffers may be structured similarly, in some respects, to the data maintained by the journal module 110, in that the data state is described as a series of instructions to modify the data state, rather than as a snapshot of a current state. For example, the journal module 110 may maintain a set of instructions to modify the data state, where the instructions are in accordance with the current schema. The transcoding module 109 may maintain a corresponding set of instructions to modify the data state, where the instructions are described in accordance with a prior version of the schema. A given instruction maintained by the journal 110 may correspond to an instruction maintained by the transcoding module 109. For example, an instruction such as $T_2 \cdot C_1 => `5`$ maintained by the journal module 110 might be represented by a corresponding instruction such as $T_1 \cdot C_1 => `5`$ in a buffer maintained by the transcoding module 109. Note that in some cases the correspondence may not necessarily be one-to-one. A given instruction in the journal module's 110 buffer may correspond to a plurality of instructions in the transcoding module's 109 buffer, and vice versa.

Figure 2A:
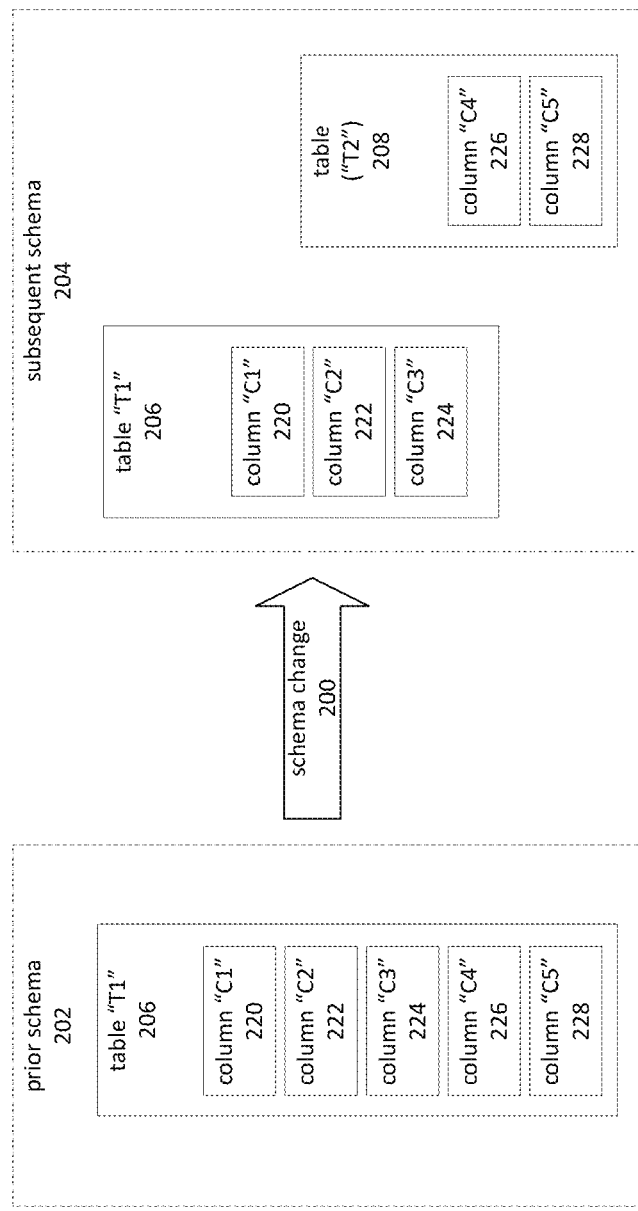
FIG. 2A is a block diagram depicting an example of a schema change.

FIG. 2A is a block diagram depicting an example of a schema change. A prior schema 202 might comprise a table "T1" 206 with columns "C1"-"C6" 220-228. A schema change 200 might produce a subsequent schema 204 in which table "T1" 206 has been modified by removing columns "C4" and "C5" 226, 228. A new table "T2" 208 may contain the columns "C4" and "C5" 226, 228 that had been moved from table "T1" 206. This might be done, for example, when a database schema is being further normalized.

A journal module, such as the transcoding module 110 that FIG. 1 depicts, might respond to a schema change by causing a source journal buffer 244 to include instructions described in terms of the subsequent schema 204, rather than those instructions described in terms of the prior schema 202. The source journal buffer 244 may refer to a primary journal containing a definitive sequence of state modification instructions, or to a secondary journal. Instructions in the source journal buffer 244 that are relative to the prior schema 202 might be converted to be compliant with the new schema, or they might be fully processed such that they may be flushed from the journal.

Figure 2B:
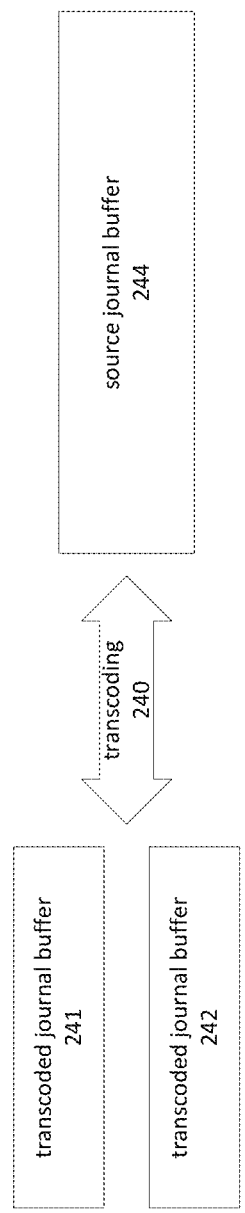
FIG. 2B is a block diagram depicting an example of buffer transcoding.

A transcoding module, such as the transcoding module 109 depicted in FIG. 1, may respond to the schema change by creating the transcoded buffers 241, 242 that are depicted in FIG. 2B, which is a block diagram depicting an example of buffer transcoding. A transcoding process 240 may synchronize instructions in the source journal module 244 with those in the transcoded journal buffers 241, 242. The transcoding process 240 may be implemented by the transcoding module 109.

The transcoding module 109 may create a transcoded journal buffer 241 in response to receiving an indication that the schema of the source journal buffer 244 is going to change and in response to receiving information indicating that at least one client is to continue to process journal events that conform to the prior version of the schema.

In FIG. 2B, the two transcoded journal buffers 241, 242 might correspond to separate journal consumers. One of the transcoded journal buffers 241 might correspond to a different subset of the instructions contained in the source journal buffer 244 than the other transcoded buffer 242, even when both of the transcoded journal buffers 241, 242 are based on the same schema version. The subsets may be based on various factors, such as the ownership of the data. For example, a stream of data might pertain to a table describing customer purchases. Each of the transcoded journal buffers 241, 242 might then pertain to state changes pertinent to an individual customer.

The transcoded journal buffers 241, 242 may comprise a ring buffer, cyclic buffer, queue or other structure for maintaining versions of the instructions held in the source journal buffer 244. In some instances, the transcoded journal buffers 241, 242 may be maintained as sliding windows over the stream of instructions represented in the source journal buffer 244.

The transcoded journal buffers 241, 242 might contain versions of the instructions in the source journal buffer 244. These may include instructions translated to comply with the schema associated with the transcoded journal buffers 241, 242. The translation may include table joins, data type adaptations, filter applications, rewritten references to schema elements, and so on.

Figure 3:
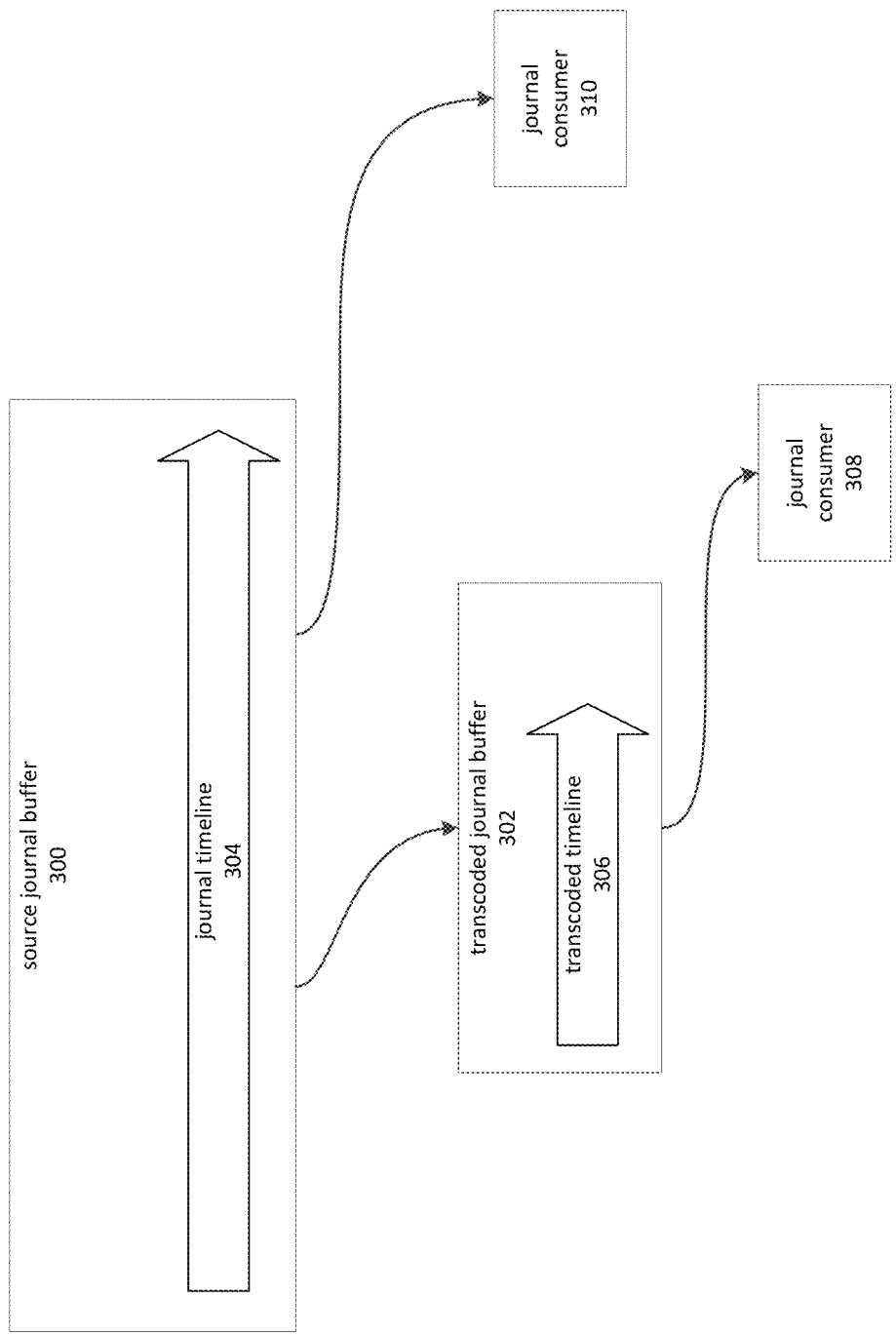
FIG. 3 is a block diagram depicting access to a transcoded buffer.

FIG. 3 is a block diagram depicting access to a transcoded buffer. Journal consumers may access the contents of a transcoded buffer when they are so authorized and, moreover, are compatible with the schema employed by the transcoded buffer. Access to the buffer may comprise receiving events indicative of changes to the data state. Access to the buffer may also comprise the ability, typically via an interface through a transcoding module, to obtain a reconstructed view of the data state relative to a point in time. For example, the buffer may be used to form a version of a row or other item that represents the row as it was at a given time. The time may, for example, correspond to a sequence number associated with an entry in the buffer.

As depicted in FIG. 3, a source journal buffer 300 may correspond to the primary view of a data state, as represented in journal form. In other words, the data state is represented in the source journal buffer 300 as a series of instructions to modify the data state, relative to some baseline. Instructions in the source journal buffer 300 are aligned along a journal timeline 304.

A journal consumer 310 may access events and state information from the source journal buffer 300 when it is authorized to do so and when it is compatible with the version of the schema used in the source journal buffer 300. Events and state information may be represented relative to the journal timeline 304.

A journal consume 308 may also access events and state information from a transcoded journal buffer 302 when it is authorized to do so and when it is compatible with the version of the schema used by the transcoded journal buffer 302. Events and state information may be represented, when accessing the transcoded journal buffer 302, relative to a transcoded timeline 304.

The journal timeline 304 may be obfuscated when provided to a journal consumer 308, 310. Obfuscation of the journal timeline may involve the computation of sequence numbers or other indicia of transaction sequencing, such that information regarding the order of events pertinent to one journal consumer 308 is not usable to reconstruct or otherwise discern information about the order of events pertinent to another journal consumer 310. For example, the journal consumers 308, 310 may be provided with sequence numbers computed independently of other event streams or of the original journal, and using a method that produces a sequence of monotonically increasing values.

Figure 4:
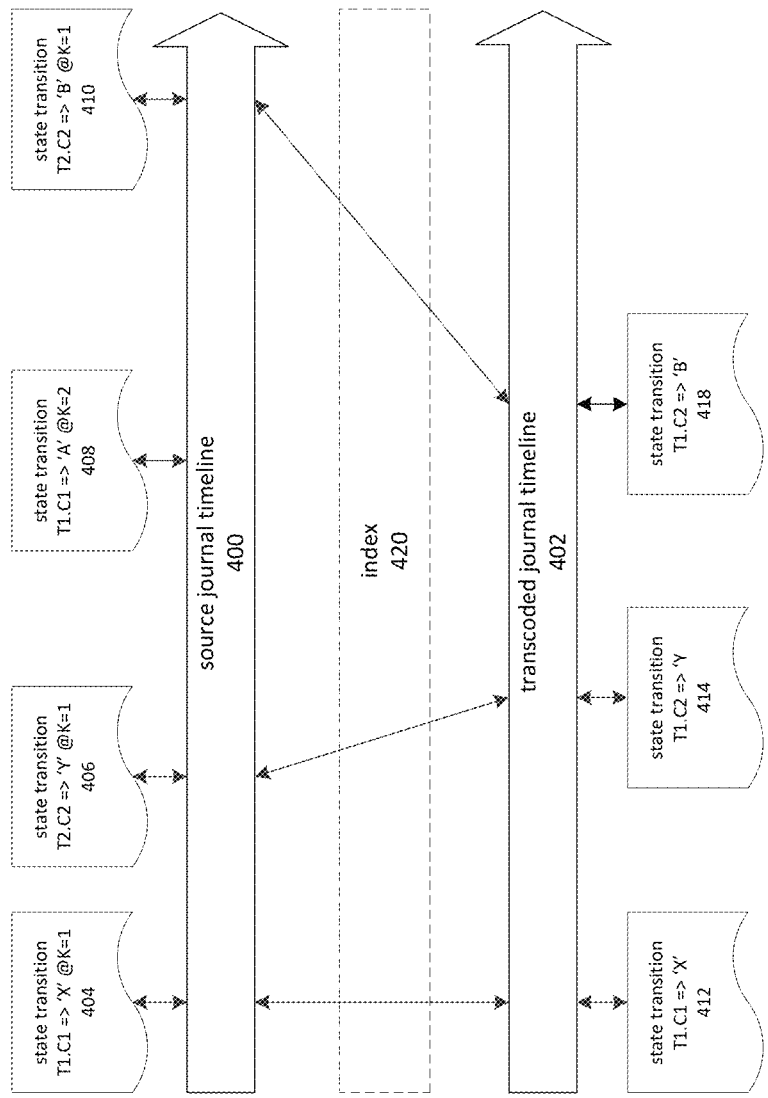
FIG. 4 is a block diagram depicting indexing of transcoded event sequences.

FIG. 4 is a block diagram depicting indexing of transcoded event sequences. A series of state transition instructions 404-410 may pertain to a source journal timeline 400. In the example FIG. 4, the sequence state transitions 404-410 may correspond to {T1·C1=>'X'@K=1, T2·C2='Y'@K=1, T1·C1=>'A'@K=2, T2·C2='B'@K=1}. This sequence may refer to a column C1 that has remained in a table C1 after a schema change and a column C2 that was moved to table T2 by a schema change. The @K notation may refer to the specific row that is modify, i.e. @K=1 indicates that a row with primary key value 1 was modified.

A corresponding sequence of events may be maintained in a transcoder buffer, such as {T1·C1=>'X,' T1·C2='Y,' T1·C1=>'A,' T1·C2='B'}. This example presumes that the prior version of the schema, on which events in the transcoded journal timeline 402 are based, had column 'C2' as a member of table 'T1.' Moreover, the transcoded journal timeline 402 may pertain to a particular subset of data to which the event consumer has access. In this example, the set of authorized data, for the depicted transcoder buffer, may be presumed to include the row with K=1 but not K=2.

The state transition events 404-410 may occur at various times on the source journal timeline 400. The receipt and processing of a state transition 404-410 on the source journal timeline 400 may trigger the generation of corresponding events on the 412-418 on the transcoded timeline.

The state transition events 404-410 on the source journal timeline 400 may each be associated with a sequence number. The sequence number may be indicative of an events position on the source journal timeline 400. A monotonically incrementing sequence number may be used.

Similarly, the state transition events 412-418 of the transcoded journal timeline 402 may be each identified by a sequence number. The sequence number for each of the state transition events 412-418 may also be a monotonically increasing sequence number. The sequence numbers of the state transition events 404-410 on the source journal timeline 400 may be independent of those associated with the state transition events 412-418 associated with the transcoded journal timeline 402.

A transcoding module may maintain an index 420 mapping sequence numbers in the state transition events 404-410 of the source journal timeline 400 to the state transition events 4412-418 of the transcoded journal timeline 402. There may be more than one active transcoding buffer, in which case there may also be more than one transcoded timeline and multiple cross references in the index. Journal consumers may be provided with access to the journal in order to correlate between event streams, limited by the extent to which they are authorized. For example, a journal consumer might be permitted to correlate between separate timelines pertaining to different tables to which the journal consumer has access.

The localized sequence numbers of the transcoded journal timeline 402 may permit greater compression efficiency if computing using a dense or compact numbering sequence. The numbering sequence may have greater density or compactness than could be achieved for reference numbers in the source journal timeline 400. The greater density or compactness may stem from a reduction in the number of state transitions that may be stored in the transcoded journal. In some cases, the sequence numbers may be used as or translated to array indexes into a transcoded journal buffer, permitting further efficiency improvements.

Figure 5:
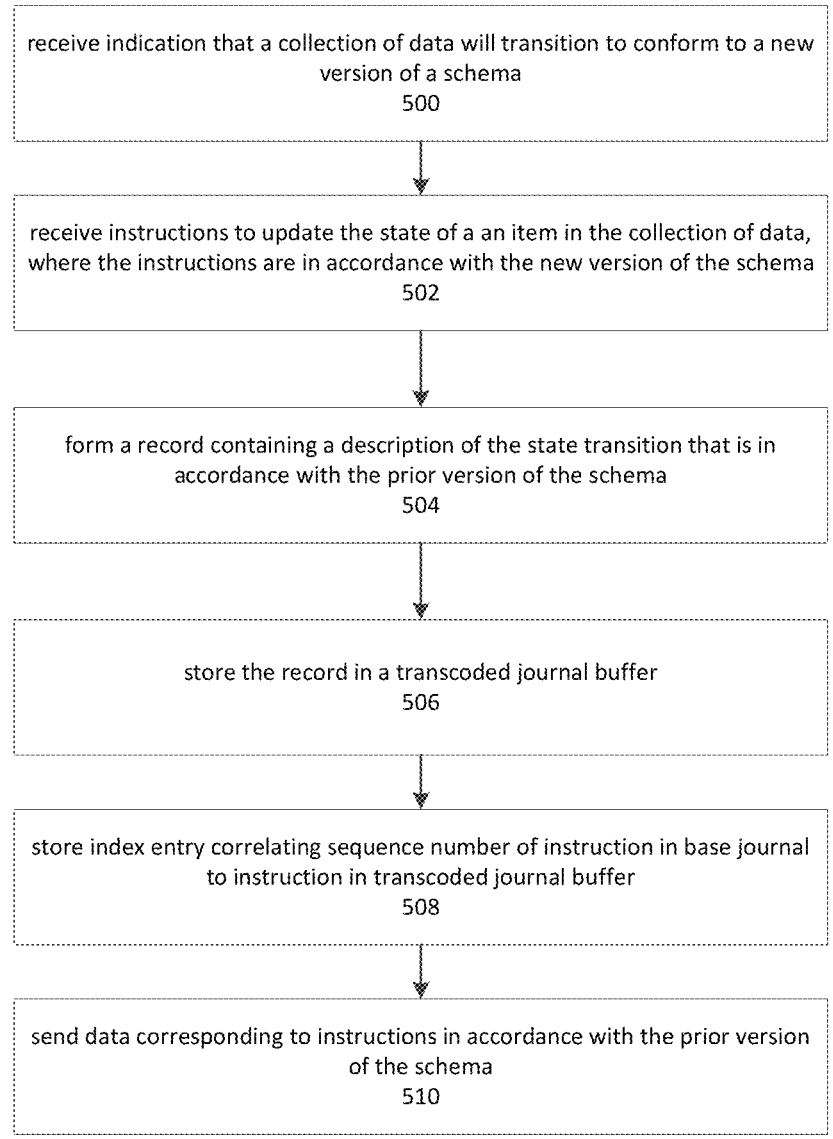
FIG. 5 is a flow diagram depicting an example process for operating a transcoded journal.

FIG. 5 is a flow diagram depicting an example process for operating a transcoded journal. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel. Embodiments of the depicted process may be implemented using various combinations of computer-executable instructions executed by a computing system, such as the computing systems described herein.

Block 500 depicts receiving an indication that a collection of data will transition so that it conforms to a new version of a schema. This may comprise a message indicating that the journal pipeline will begin accepting requests to change the data state that are expressed in terms of the new schema. This may occur prior to a point in time at which the physical structure of the collection of data has been modified.

In some cases, a transcoded journal may be created and used for purposes other than schema evolution, however. For example, even if the schema does not change a transcoded buffer might be created to serve as an abstraction layer between the schema as viewed by the buffer's consumer and the underlying schema used by the system. A transcoded buffer might also be employed to establish a restricted view of the journal, for example one that contains update instructions pertinent to a particular client.

In some cases, a transcoded journal may be created based on schemas that are generally equivalent, or that are equivalent except for criteria that limits records included in the transcoded journal. For example, a transcoded journal might conform to a view definition that limits the contents of a journal based on some criteria, such as the identity or authorization characteristics of a client of the transcoded journal.

Block 502 depicts receiving a request to update the state of a collection of data. The request may comprise instructions for updating the state, described in accordance with the new version of the schema. For example, the instructions might contain a primary key value identifying a row to be modified, and one or more values for columns within the row to be modified. The instructions thus describe a state change. The instructions are in accordance with a particular version of a schema when they properly refer to the names or positions of elements in the schema. For example, a first version of a schema might refer to a table named "X," while a second version may have renamed the same table as "Y." In another example, the order of the columns within a row might have been altered. If a table had columns $C_x$, $C_y$, $C_z$, a compliant use of the schema might be one which conformed to that order, and did not for example presume the columns to be in the order $C_y$, $C_x$, $C_z$. Similarly, a compliant use of the schema would refer to renamed columns by their new names. Other examples of state change instructions that are in accordance with a version of a schema may relate to constraints, data types, and so on.

Block 504 depicts forming a record that contains a description of the state transition, corresponding to the received request, but is expressed in accordance with the prior version of the schema. In other words, the incoming instructions to modify the state of the collection may be translated, as appropriate, from the new version of the schema to a prior version of the schema.

This may comprise identifying instructions that refer to new or changed schema elements and mapping from that element to an equivalent that is defined in the older version of the schema. For example, the translocation module might identify a column that has been relocated in a new version of a schema, map to the column's prior location, and then rewrite the instructions based on the mapping.

Block 506 depicts storing the record in a transcoded journal, i.e. in a buffer holding the transcoded instructions. The buffer may be formed initially in response to receiving an indication that the collection of data is to switch to a new version of a schema.

In some instances, the buffer may be formed in response to receiving information indicating that a client of the journal, i.e. a journal consumer, is compatible with the earlier version of the schema. The buffer may be created in response to the combination of a client needing to interact with a first version of a schema and the collection migrating to a second version. For example, the transcoding module might receive an indication that the collection of data is migrating to a new version of a schema, combined with a list of clients not compatible with the new version. The list might also specify which versions of the schema with which the clients are compatible.

In some instances, the buffer may be formed for other reasons, such as to provide a filtered view of change instructions stored in the source journal. For example, a transcoded buffer might be created to contain only those instructions pertinent to a particular client. In another example, a transcoded buffer might be created as a way of providing an alternative view of data maintained in the collection. For example, the underlying schema might define two tables $T_1$ and $T_2$, while a transcoded buffer might be constructed to represent a joined view $V_1$ of the two tables $T_1$ and $T_2$.

A transcoded journal may contain a plurality of records describing state transitions in accordance with the version of the schema with which the client of the journal is compatible. The records may correspond to a subset of records stored in the source journal, though the records in the source journal would typically be stored in a format compatible with the new version of the schema, rather than a prior version. Note, however, that there might be a transition period in which at least some instructions contained in the source journal refer to an earlier version of a schema.

Block 508 depicts storing an index entry that correlates between a sequence number associated with an entry in the source journal to a sequence number associated with a corresponding entry in the transcoded journal.

Sequence numbers for entries in the transcoded journal may be computing using a function that monotonically increases a prior sequence number on the same timeline. In other words, each record within a transcoded journal may be associated with an ascending sequence number. The values uses as sequence numbers may be computed independently of sequence numbers used elsewhere.

In order to provide services for correlating between different transcoded journals and between a transcoded journal and the source journal, embodiments may maintain an index of mappings between sequence numbers in a transcoded journal and corresponding sequence numbers in the source journal. Various equivalent approaches may be used, such as mapping between records in a transcoded journal and corresponding records in a source journal. Identifying one or more records stored in the second buffer that are associated with the client.

Block 510 depicts sending data that corresponds to the instructions to a journal consumer, expressed in accordance with the prior version of the schema. The data may, for example, be an event descriptor that is indicative of the state change, as the state change would be viewed by a journal consumer still processing events in terms of the prior schema version.

Figure 6:
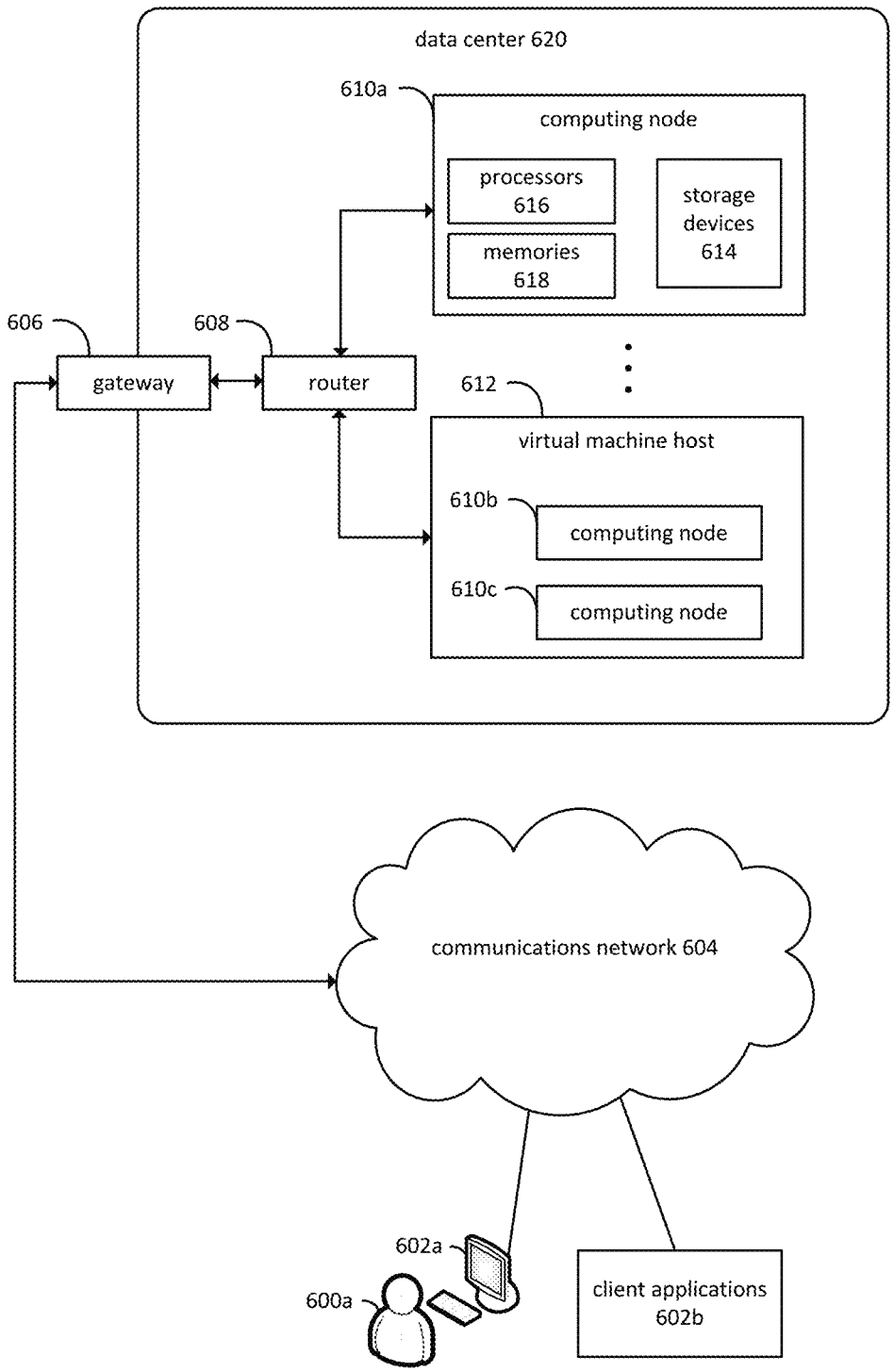
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600*a* may interact with various client applications, operating on any type of computing device 602*a*, to communicate over communications network 604 with processes executing on various computing nodes 610*a*, 610*b*, and 610*c* within a data center 620. Alternatively, client applications 602*b* may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610*a*, 610*b*, and 610*c*, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610*a*, 610*b*, and 610*c*. Some of these intermediate layers may themselves comprise processes executing on one or more of the computing nodes. Computing nodes 610*a*, 610*b*, and 610*c*, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610*a* is depicted as residing on physical hardware comprising one or more processors 616, one or more memories 618, and one or more storage devices 614. Processes on computing node 610*a* may execute in conjunction with an operating system or alternatively may execute as a bare-metal process that directly interacts with physical resources, such as processors 616, memories 618, or storage devices 614.

Computing nodes 610*b* and 610*c* are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
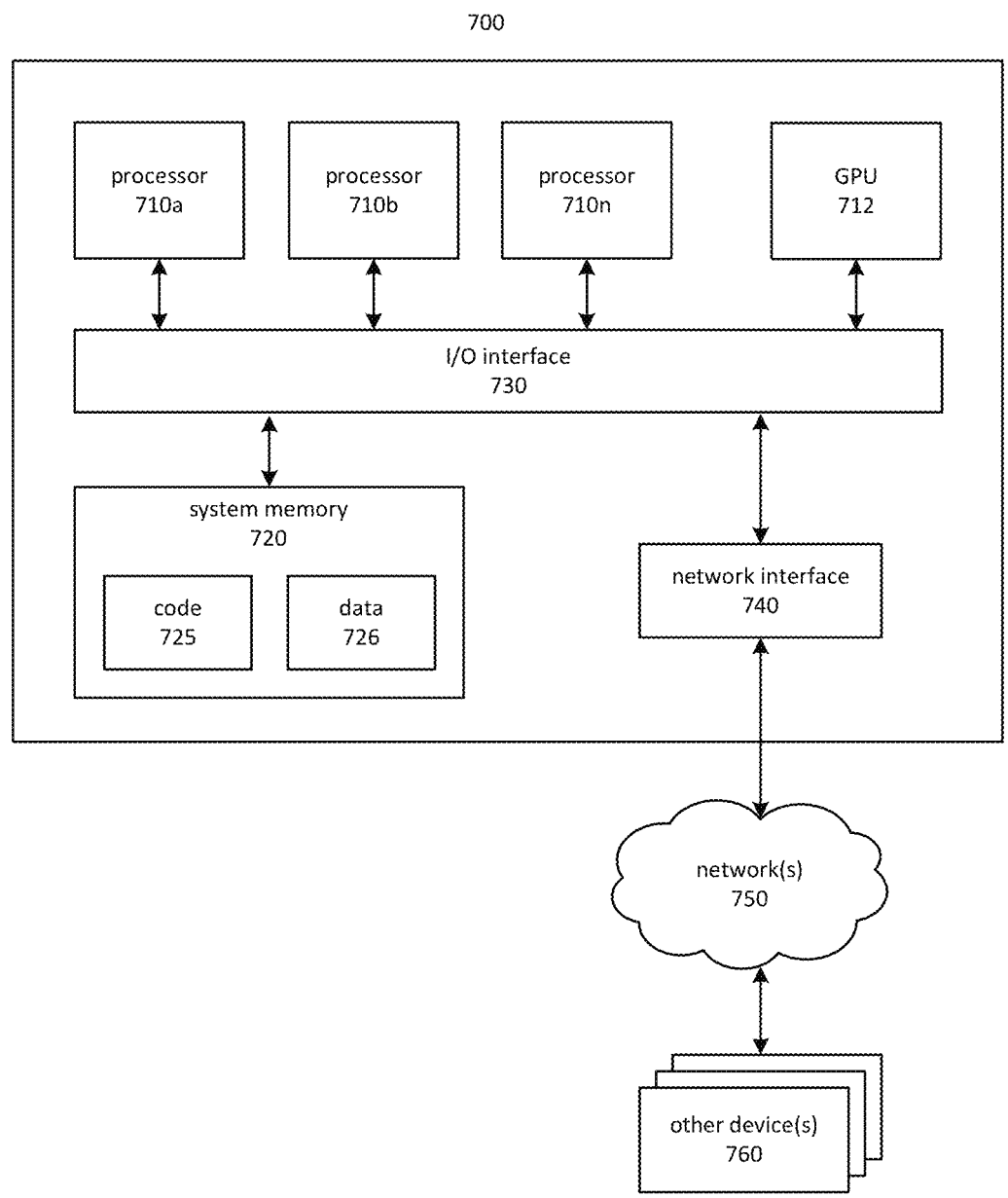
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 800 includes one or more processors 710*a*, 710*b*, and/or 710*n* (which may be referred herein singularly as a processor 710 or in the plural as the processors 710) coupled to a system memory 720 via an input/output ("I/O") interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect ("PCI") bus standard or the Universal Serial Bus ("USB") standard, for example. In some embodiments, the function of I/O interface 730 may be split into two or more separate components, such as a north bridge and a south bridge, for example. Also, in some embodiments some or all of the functionality of I/O interface 730, such as an interface to system memory 920, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   at least one processor; and
   a memory comprising instructions that, in response to execution by the at least one processor, cause the system to at least:
   store a collection of data conforming to a first version of a schema;
   receive a second version of the schema;
   receive an update to an item in the collection of data, wherein the update is described in accordance with the second version of the schema;
   translate the update to the item in the collection of data to describe the update in accordance with the first version of the schema;
   associate a first sequence number with the translated update and a first position along a source journal timeline;
   associate a second sequence number with the update and a second position along a translated timeline defined by increasing sequence numbers independent of sequence numbers defining the source journal timeline;
   store, in an index, a record mapping the first sequence number associated with the first position to the second sequence number associated with the second position, wherein entries in a first journal are in accordance with the first version of the schema and entries in a second journal are in accordance with the second version of the schema; and
   provide access to the first journal to a computing device.

2. The system of claim 1, wherein the instructions, in response to execution by the at least one processor, cause the system to at least:
   store information indicative of the update in the first journal.

3. The system of claim 2, wherein the information indicative of the update is stored, in the first journal, in accordance with the first version of the schema, and wherein the information indicative of the update is stored, in the second journal, in accordance with the second version of the schema.

4. The system of claim 3, wherein the record comprises information mapping between an entry in the first journal and an entry in the second journal.

5. The system of claim 1, wherein the update to the item is processed prior to converting the collection of data to conform to the second version of the schema.

6. A computer-implemented method, comprising:
   storing a collection of data conforming to a first version of a schema;
   receiving a second version of the schema;
   receiving an update to a data item stored in the collection of data, wherein the update is described in accordance with the second version of the schema;
   translating the update to the data item stored in the collection of data to describe the update in accordance with the first version of the schema;
   associate a first sequence number with the translated update and a first position along a source journal timeline;
   associate a second sequence number with the update and a second position along a translated timeline defined by increasing sequence numbers independent of sequence numbers defining the source journal timeline;
   storing, in an index, a record mapping the first sequence number associated with the first position to the second sequence number associated with the second position, wherein entries in a first journal are in accordance with the first version of the schema and entries in a second journal are in accordance with the second version of the schema; and
   providing access to the first journal to a computing device.

7. The computer-implemented method of claim 6, wherein translated updates are stored in the second journal, and updates are stored in the first journal prior to the translated updates being applied to the collection of data.

8. The computer-implemented method of claim 6, wherein the update is stored in the first journal in accordance with the first version of the schema, and the translated update is stored in the second journal in accordance with the second version of the schema.

9. The computer-implemented method of claim 8, wherein the record comprises information mapping from an entry in the first journal to an entry in the second journal.

10. The computer-implemented method of claim 8, wherein the second journal is representative of a view of the collection of data described in accordance with the second version of the schema.

11. The computer-implemented method of claim 6, wherein the index relates state transitions in the first journal to state transitions in the second journal.

12. The computer-implemented method of claim 6, wherein the update to the data item is processed prior to converting the collection of data to conform to the second version of the schema.

13. The computer-implemented method of claim 6, further comprising:
sending the translated update to a computing device compatible with the first version of the schema.

14. A non-transitorycomputer-readable storage medium having stored thereon executable instructions that, upon execution by a computing device, cause the computing device at least to:
store a collection of data in accordance with a first version of a schema;
receive a second version of the schema;
receive an update to an item stored in the collection of data, wherein the update is described in accordance with the second version of the schema;
translate the update to the item in the collection of data to describe the update in accordance with the first version of the schema;
associate a first sequence number with the translated update and a first position along a source journal timeline;
associate a second sequence number with the update and a second position along a translated timeline defined by increasing sequence numbers independent of sequence numbers defining the source journal timeline;
store, in an index, a record mapping the first sequence number associated with the first position to the second sequence number associated with the second position, wherein entries in a first journal are in accordance with the first version of the schema and entries in a second journal are in accordance with the second version of the schema; and
provide access to the first journal to a computing device.

15. The non-transitory computer-readable storage medium of claim 14, comprising further instructions that, upon execution by the computing device, cause the computing device to at least:
store information indicative of the update in the first journal in accordance with the first version of the schema.

16. The non-transitory computer-readable storage medium of claim 15, comprising further instructions that, upon execution by the computing device, cause the computing device to at least:
store information indicative of the translated update, in the second journal, in accordance with the second version of the schema.

17. The non-transitory computer-readable storage medium of claim 16, wherein the record comprises information mapping from an element of the first journal to an element of the second journal.

18. The non-transitory computer-readable storage medium of claim 14, wherein the first journal comprises a definitive sequence of state modification instructions.

19. The non-transitory connputer-readable storage medium of claim 14, wherein the index relates state transitions in the first journal to state transitions in the second journal.

20. The non-transitory computer-readable storage medium of claim 14, wherein the update to the item is processed prior to converting the collection of data to conform to the second version of the schema.

* * * * *